US008891722B2

(12) United States Patent
Kulesza et al.

(10) Patent No.: US 8,891,722 B2
(45) Date of Patent: Nov. 18, 2014

(54) SUPPORT APPARATUS FOR SUPPORTING DOSIMETRY SYSTEM IN PROXIMITY TO REACTOR APPARATUS

(75) Inventors: Joel A. Kulesza, Monroeville, PA (US); Arnold H. Fero, New Kensington, PA (US); Alexander W. Harkness, Gibsonia, PA (US)

(73) Assignee: Westinghouse Electric Company LLC, Cranberry Township, PA (US)

( * ) Notice: Subject to any disclaimer, the term of this patent is extended or adjusted under 35 U.S.C. 154(b) by 509 days.

(21) Appl. No.: 13/329,497

(22) Filed: Dec. 19, 2011

(65) Prior Publication Data

US 2013/0153715 A1 Jun. 20, 2013

Related U.S. Application Data

(60) Provisional application No. 61/425,811, filed on Dec. 22, 2010.

(51) Int. Cl.
*G01T 1/02* (2006.01)

(52) U.S. Cl.
CPC .......................................... *G01T 1/02* (2013.01)
USPC ........... 376/254; 376/154; 376/249; 285/330; 285/405; 248/73

(58) Field of Classification Search
CPC .... G01T 1/02; G21C 13/02; G21C 13/13028; G21D 1/00; G21D 3/04; H02G 3/30; F16L 9/00; F16L 9/22; F16L 23/14; F16L 25/00; F16L 37/08; F16L 37/124; F16L 41/00
USPC ............. 248/65, 67.5, 73; 285/148.25, 292.1, 285/330, 405, 332.4, 406; 403/337, 336, 403/356, 364, 378, 380, 383, 338; 376/154, 376/249, 254
See application file for complete search history.

(56) References Cited

U.S. PATENT DOCUMENTS

| 143,348 A | * | 9/1873 | Holmes | 285/325 |
| 1,985,544 A | * | 12/1934 | Muchnic | 285/135.5 |
| 2,474,431 A | * | 6/1949 | Lipman et al. | 285/367 |

(Continued)

OTHER PUBLICATIONS

Written Opinion of the International Searching Authority for PCT/US2011/066393 dated Apr. 18, 2012 (Form PCT/ISA/237).

(Continued)

*Primary Examiner* — Terrell McKinnon
*Assistant Examiner* — Eret McNichols
(74) *Attorney, Agent, or Firm* — Joseph C. Spadacene; Richard J. Coldren; Westinghouse Electric Company LLC (57) ABSTRACT

An improved support apparatus is structured to support a dosimetry system within an interior region of a containment apparatus. The dosimetry system is supported in a region between an interior surface of the containment apparatus and an exterior surface of a reactor apparatus that is disposed within the interior of the containment apparatus. The support apparatus includes a retention apparatus having a plurality of brace elements that each have a receptacle formed therein. The receptacles are aligned with one another when installed within the interior of the containment apparatus. The support apparatus further includes a tube apparatus that includes a plurality of tube segments that are connectable together. The dosimetry system is situated within an elongated cavity formed in the tube apparatus. The tube apparatus is situated in the receptacles and thereby supports the dosimetry system on the containment apparatus.

15 Claims, 8 Drawing Sheets

(56) References Cited

U.S. PATENT DOCUMENTS

| | | | |
|---|---|---|---|
| 2,956,587 A * | 10/1960 | Fisher | 285/407 |
| 3,533,650 A * | 10/1970 | Smith | 285/197 |
| 3,905,623 A * | 9/1975 | Cassel | 285/382 |
| 4,196,047 A | 4/1980 | Mitchem et al. | |
| 4,502,189 A * | 3/1985 | Sieberkrob et al. | 24/279 |
| 4,567,016 A * | 1/1986 | Tong | 376/283 |
| 4,577,449 A * | 3/1986 | Celli | 403/191 |
| 4,614,635 A * | 9/1986 | Terhune | 376/154 |
| 4,639,349 A * | 1/1987 | Baratta et al. | 376/254 |
| 4,842,807 A * | 6/1989 | Fero et al. | 376/254 |
| 4,844,858 A * | 7/1989 | Fero et al. | 376/254 |
| 5,026,096 A * | 6/1991 | Lutz, II | 285/114 |
| 5,268,944 A * | 12/1993 | Ekeroth et al. | 376/289 |
| 5,481,835 A * | 1/1996 | Bloom | 52/98 |
| 5,526,385 A * | 6/1996 | Stockhausen et al. | 376/284 |
| 5,682,409 A * | 10/1997 | Caine | 376/202 |
| 5,699,394 A * | 12/1997 | Schreiber et al. | 376/289 |
| 6,065,532 A * | 5/2000 | Brownlee | 165/134.1 |
| 6,205,739 B1 * | 3/2001 | Newlin | 52/655.1 |
| 6,557,908 B2 * | 5/2003 | Houtschilt et al. | 285/420 |
| 6,622,976 B1 * | 9/2003 | Ianello | 248/73 |
| 6,814,184 B1 * | 11/2004 | Blinn, Jr. | 182/178.1 |
| 7,410,192 B2 * | 8/2008 | Ignaczak et al. | 285/373 |
| 7,516,590 B2 * | 4/2009 | Brinkmann | 52/651.01 |
| 7,744,042 B2 * | 6/2010 | Heath | 248/65 |
| 7,823,347 B1 * | 11/2010 | Blinn | 52/244 |
| 7,832,776 B2 * | 11/2010 | Cassel et al. | 285/420 |
| 7,931,242 B2 * | 4/2011 | Tjerrild | 248/58 |
| 8,356,778 B2 * | 1/2013 | Birli et al. | 248/73 |
| 8,376,289 B2 * | 2/2013 | Heath | 248/65 |
| 8,461,540 B2 * | 6/2013 | Nakashima et al. | 250/368 |
| 2003/0075923 A1 * | 4/2003 | Lepoutre | 285/330 |
| 2004/0022343 A1 * | 2/2004 | Butler et al. | 376/260 |
| 2008/0185841 A1 * | 8/2008 | Ignaczak et al. | 285/261 |
| 2009/0026324 A1 * | 1/2009 | Hensley et al. | 248/65 |
| 2009/0065657 A1 * | 3/2009 | Heath | 248/65 |
| 2010/0084519 A1 * | 4/2010 | Tjerrild | 248/71 |
| 2010/0290576 A1 * | 11/2010 | Yamazaki et al. | 376/299 |
| 2011/0056950 A1 * | 3/2011 | Demoise et al. | 220/378 |
| 2011/0163208 A1 * | 7/2011 | Tjerrild | 248/65 |
| 2011/0284752 A1 * | 11/2011 | Nakashima et al. | 250/368 |
| 2012/0177164 A1 * | 7/2012 | Gels et al. | 376/205 |
| 2012/0292460 A1 * | 11/2012 | Hsu | 248/70 |

OTHER PUBLICATIONS

International Preliminary Report on Patentability for PCT/US2011/066393 dated Jun. 25, 2013 (Forms PCT/IB/373, PCT/ISA/237).

* cited by examiner

SUPPORT APPARATUS FOR SUPPORTING DOSIMETRY SYSTEM IN PROXIMITY TO REACTOR APPARATUS

CROSS-REFERENCE TO RELATED APPLICATION

This application claims priority from U.S. Provisional Patent Application Ser. No. 61/425,811 filed Dec. 22, 2010, and entitled "Compact Bottom-Supported Ex-Vessel Neutron Dosimetry System", the disclosures of which are incorporated herein by reference.

BACKGROUND

1. Field

The disclosed and claimed concept relates generally to nuclear power generation systems and, more particularly, to a support apparatus for supporting a dosimetry system in proximity to a reactor apparatus.

2. Description of Related Art

As is generally understood in the relevant art, nuclear power plants typically employ a number of reactor apparatuses to generate thermal power which is, in turn, converted into electrical power. As employed herein, the expression "a number of" and variations thereof shall refer broadly to any non-zero quantity, including a quantity of one. For safety reasons and for other reasons, it is often desirable to place about the exterior of a reactor apparatus a number of dosimetry devices that are configured to enable one to retrospectively characterize the radiation environment experienced by the devices over time. For example, one type of dosimetry system is an ex-vessel neutron dosimetry (EVND) system that includes a set of dosimetry capsules that are connected together by lengths of chain and are contained within a nuclear containment at the exterior of a reactor pressure vessel. While such systems have been generally effective for their intended purposes, they have not been without limitation.

In particular, such dosimetry systems must be removed from their position in proximity to the reactor apparatus in order to be analyzed and to obtain dosimetry information therefrom. A replacement dosimetry system then must be installed in place of the dosimetry system that has been removed. Since space typically is limited in the regions peripheral to a reactor apparatus, the initial installation and continued replacement of dosimetry systems can be difficult. Such difficulty can be compounded by the fact that such regions typically can be accessed only from areas below the reactor assembly or above the reactor assembly. Moreover, since the dosimetry data that is obtained from dosimetry systems is meaningful only when the precise positions of the dosimetry capsules is known, some difficulty has been encountered in reliably positioning ex-vessel dosimetry system in nuclear environments.

SUMMARY

Accordingly, an improved support apparatus is structured to support a dosimetry system within an interior region of a containment apparatus. The dosimetry system is supported in a region between an interior surface of the containment apparatus and an exterior surface of a reactor apparatus that is disposed within the interior of the containment apparatus. The support apparatus includes a retention apparatus having a plurality of brace elements that each have a receptacle formed therein. The receptacles are aligned with one another when installed within the interior of the containment apparatus. The support apparatus further includes a tube apparatus that includes a plurality of tube segments that are connectable together. The dosimetry system is situated within an elongated cavity formed in the tube apparatus. The tube apparatus is situated in the receptacles and thereby supports the dosimetry system on the containment apparatus.

As such, an aspect of the disclosed and claimed concept is to provide an improved support apparatus that is structured to support a dosimetry system in proximity to a nuclear reactor apparatus.

Another aspect of the disclosed and claimed concept is to provide such a support apparatus that enables the dosimetry system to be removed and replaced with another dosimetry system.

Another aspect of the disclosed and claimed concept is to provide a support apparatus, at least a portion of which can be installed during initial construction of a nuclear power plant, and which can subsequently be employed to support a dosimetry system if the power plant is desired to be upgraded to provide such a dosimetry feature.

Accordingly, an aspect of the disclosed and claimed concept is to provide an improved support apparatus that is structured to support a dosimetry system within an interior region of a containment apparatus. The containment apparatus has an interior surface adjacent the interior region. The support apparatus is structured to be situated between the interior surface and at least a portion of a reactor apparatus that is disposed in the interior region. The support apparatus can be generally stated as including a retention apparatus and a tube apparatus. The retention apparatus can be generally stated as including a plurality of brace elements that are each structured to be mounted to at least one of the containment apparatus and the reactor apparatus. At least some of the brace elements each have a receptacle formed therein. The brace elements are structured to be situated such that the receptacles are aligned with one another when installed within the interior region of the containment apparatus. The tube apparatus can be generally stated as including a plurality of tube segments that are structured to be connected together. At least a portion of the tube apparatus is structured to be received in at least some of the receptacles. The tube apparatus is structured to support the dosimetry system.

BRIEF DESCRIPTION OF THE DRAWINGS

A further understanding of the disclosed and claimed concept can be gained from the following Description of the Preferred Embodiments when read in conjunction with the accompanying drawings in which:

Similar numerals refer to similar parts through the specification.

DESCRIPTION OF THE PREFERRED EMBODIMENTS

Figure 1:
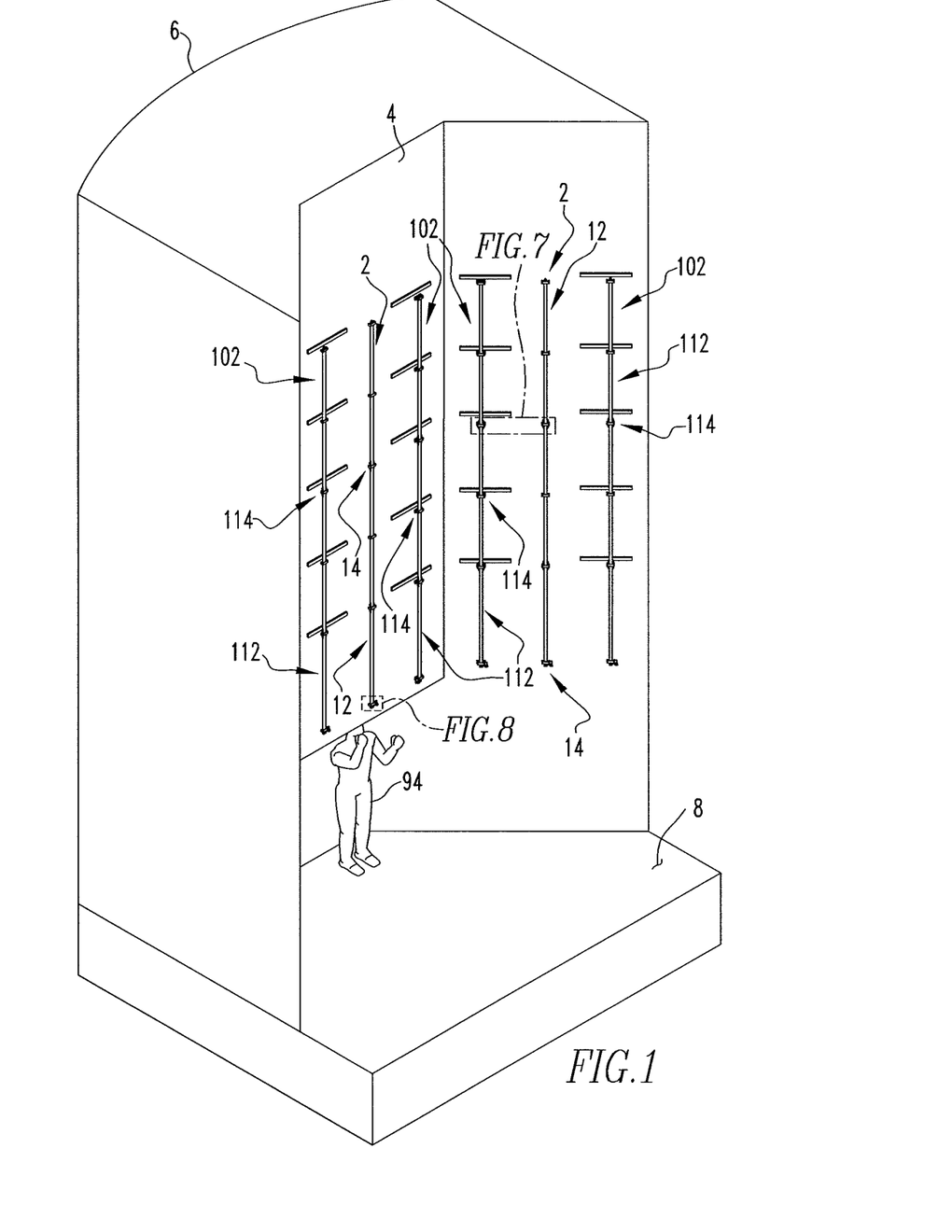
FIG. 1 is a perspective view of a support apparatus in accordance with a first embodiment of the disclosed and claimed concept as well as a support apparatus in accordance with a second embodiment of the disclosed and claimed concept installed on an interior surface of a containment apparatus.
Figure 2:
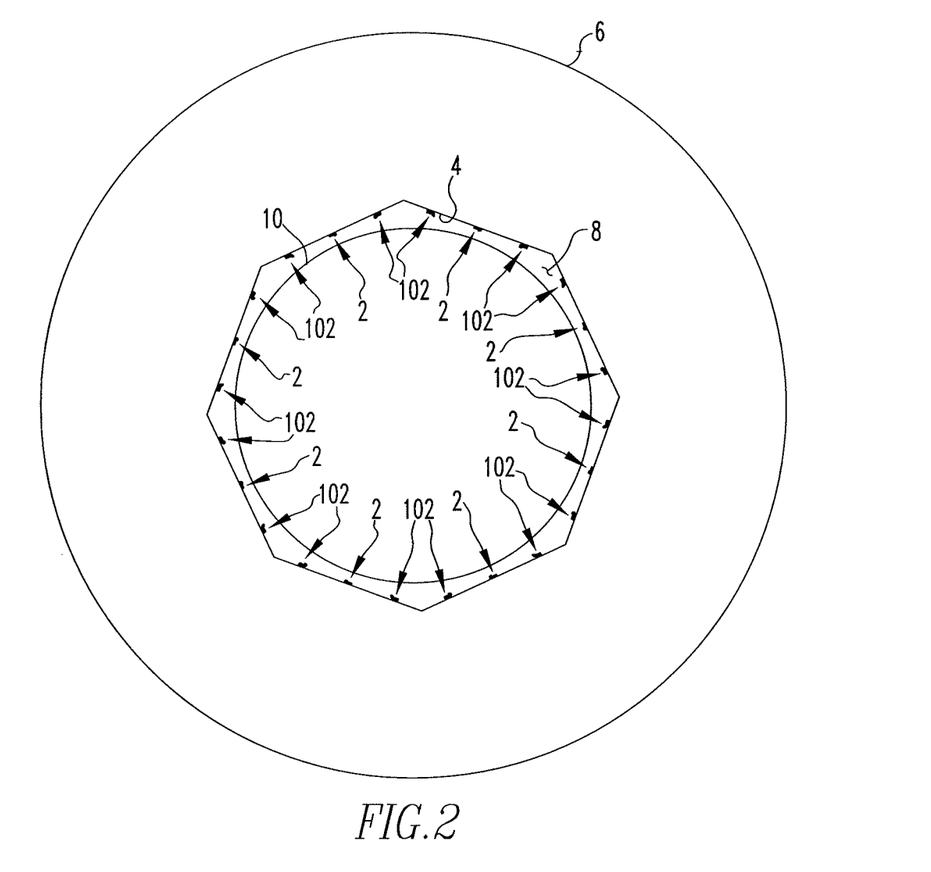
FIG. 2 is a top plan view of the containment apparatus of FIG. 1 and a reactor apparatus situated in an interior region of the containment apparatus.

An improved support apparatus 2 in accordance with a first embodiment of the disclosed and claimed and another improved support apparatus 102 in accordance with a second embodiment of the disclosed and claimed concept are depicted in FIG. 1 as being installed on an interior surface 4 of a containment apparatus 6. FIG. 1 depicts only a portion of the containment apparatus 6 whereas FIG. 2 depicts in a schematic fashion a plan view of the entire containment apparatus 6 having an interior region 8 and having a reactor apparatus 10 installed within the interior region 8. As can be understood from FIG. 2, the interior region 8 is of an octagonal configuration, and the support apparatuses 2 and 102 are situated on the interior surface 4 in the relatively small spaces that are disposed between the interior surface 4 and the reactor apparatus 10. As can further be understood from FIG. 2, the support apparatuses 2 are situated generally centrally along each of the eight walls of the interior surface 4 at the locations where the reactor apparatus 10 is in closest proximity to the interior surface 4. The support apparatuses 102, on the other hand, are situated adjacent the corner regions where pairs of adjacent surfaces converge to form corners of the interior surface 4. In the exemplary embodiment depicted herein, therefore, eight of the support apparatuses 2 are installed on the interior surface 4 whereas sixteen of the support apparatuses 102 are mounted on the interior surface 4.

Figure 3:
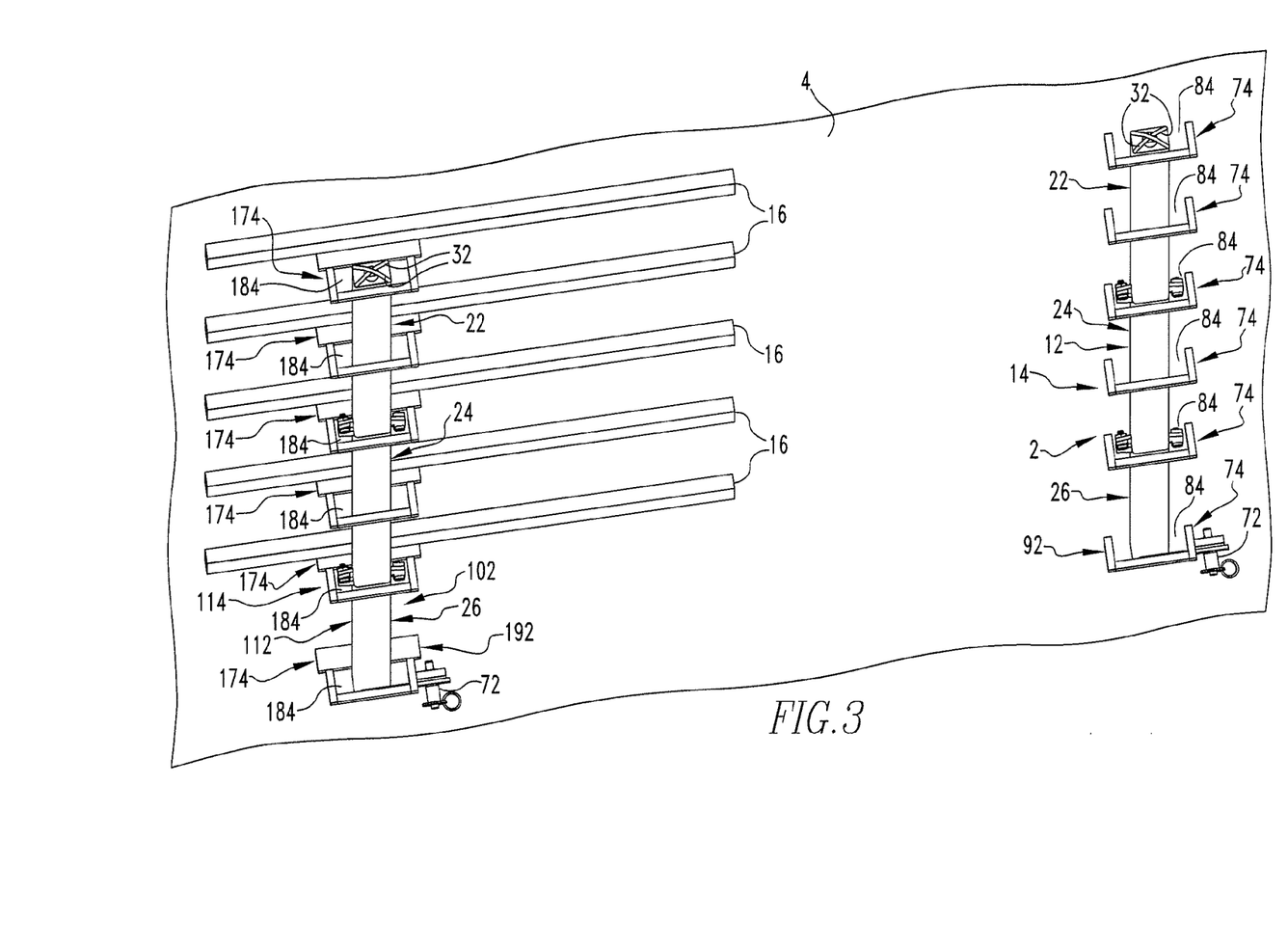
FIG. 3 is a close-up frontal view looking in a generally downward direction from the perspective of FIG. 1 of two of the support apparatuses of FIG. 1.

As can be understood from FIGS. 1 and 3, the support apparatus 2 can be said to include a tube apparatus 12 and a retention apparatus 14. Moreover, the support apparatus 102 can be said to include a tube apparatus 112 and a retention apparatus 114. The tube apparatus 12 and the tube apparatus 112 are identical, and it thus is noted that the difference between the support apparatus 2 and the support apparatus 102 lies in the retention apparatus 14 being different from the retention apparatus 114. In particular, the retention apparatus 114 enables the tube apparatus 112 to avoid a number of structures, such as are depicted schematically in FIGS. 1 and 3 and are indicated in FIG. 3 with the numeral 16, that may be mounted on the interior surface 4 for various reasons. Since the tube apparatus 12 and the tube apparatus 112 are identical, the description set forth below is stated in the context of the tube apparatus 12, it being understood that such description is equally applicable to the tube apparatus 112 unless a specific exception is noted.

Figure 4:
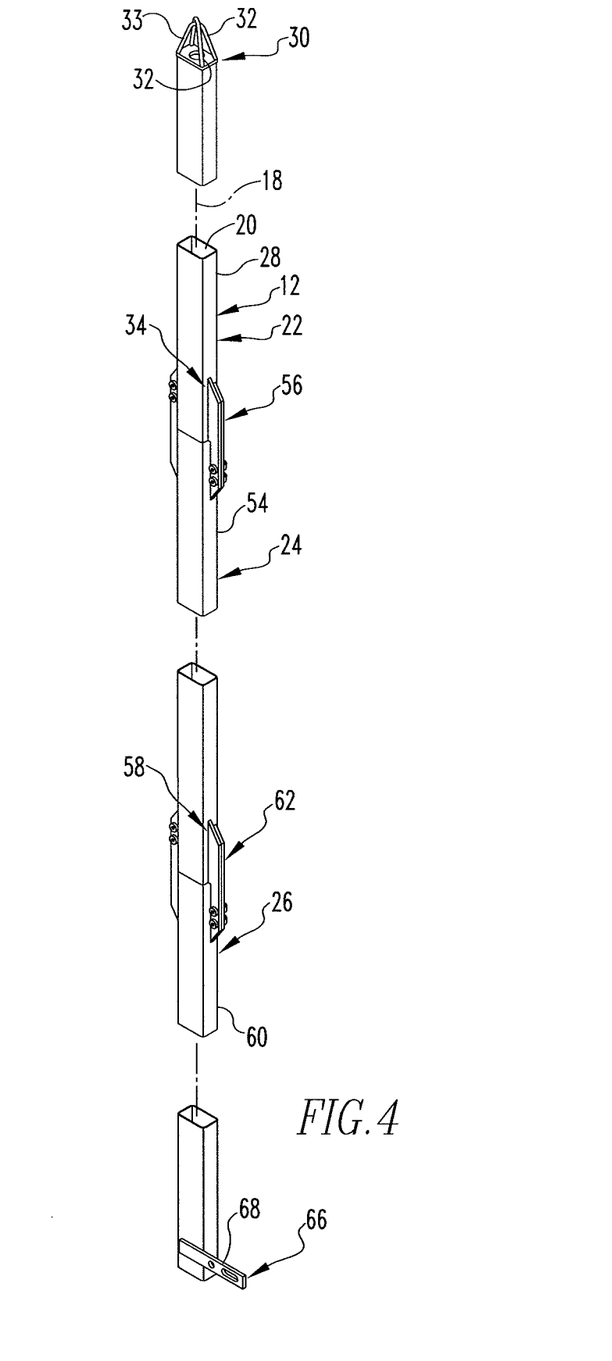
FIG. 4 is a perspective view, partially cut away, of a tube apparatus of the improved support apparatus depicting a dosimetry system installed therein.

As can be understood from FIG. 4, the tube apparatus 12 carries a dosimetry system 18 (depicted schematically with a broken line) within a longitudinal cavity 20 that is formed in the tube apparatus 12. The dosimetry system 18 includes a number of dosimetry capsules that are connected together in a spaced-apart arrangement by a number of lengths of flexible metal conduit. In particular, the flexible metal conduit and the dosimetry capsules are disposed within a tube of metal that is self-supporting but that has a certain degree of flexibility. As such, the dosimetry system 18 that is situated in the cavity 20 positions the dosimetry capsules (not expressly depicted herein) at precisely known positions within the tube apparatus 12.

Figure 4A:
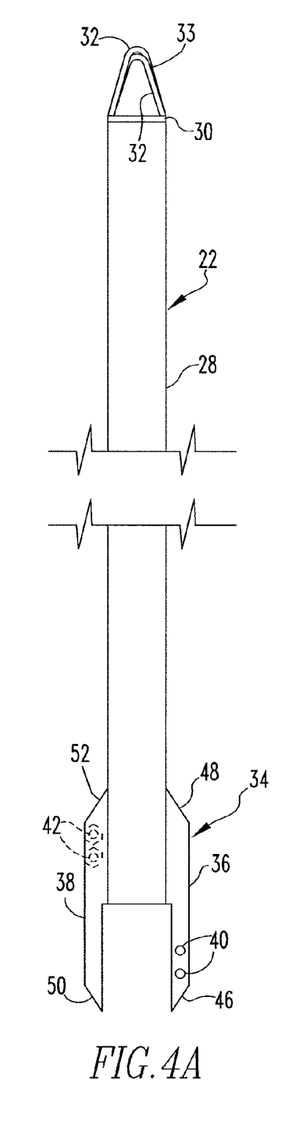
FIGS. 4A, 4B, and 4C depict a leading tube segment, a middle tube segment, and a trailing tube segment, respectively, of the tube apparatus that is depicted generally in FIG. 4.
Figure 4B:
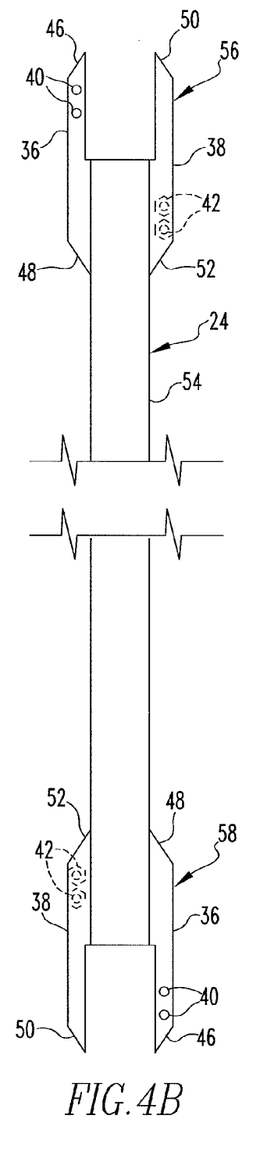
Figure 4C:
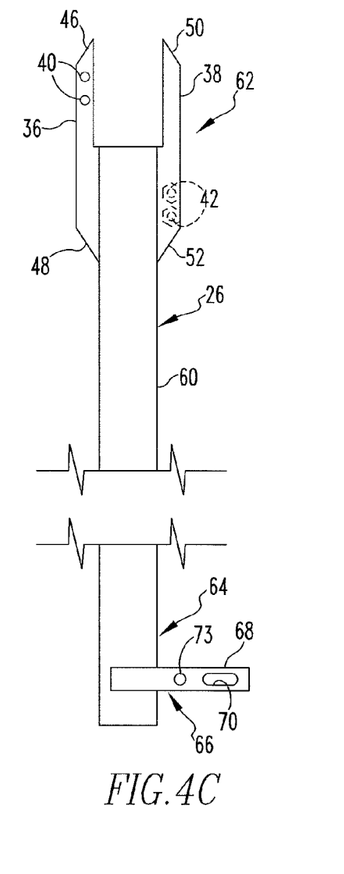

The tube apparatus 12 is depicted in FIGS. 1 and 3 as being in an assembled condition, but it is depicted in FIG. 4 as being in a partly cut away condition to depict the dosimetry system 18 situated within the longitudinal cavity 20 and to fit the tube apparatus 12 onto the page of FIG. 4. The tube apparatus 12 actually includes three separate elongated components which, when assembled, form the tube apparatus 12. Specifically, the tube apparatus 12 can be said to include a leading tube segment 22, a middle tube segment 24, and a trailing tube segment 26, which are depicted in FIGS. 4A, 4B, and 4C, respectively, and which are longitudinally aligned with one another when in the assembled condition.

The leading tube segment 22 can be said to include an elongated leading tube element 28 having a leading end 30 that is configured to have a rounded bullet-nose profile through the use of a number of bent rod elements 32 affixed to the leading tube segment 22. The leading end 30 thus has an outer surface 33 on the rod elements 32 that can be generally said to be largely oriented oblique to the longitudinal extent of the leading tube element 28. As employed herein, the expression "oblique" and variations thereof shall refer to a relationship that is neither perpendicular nor parallel. The rounded shape of the leading end 30 facilitates its insertion into a number of receptacles formed in the retention apparatus 14 and 114, as will be described in greater detail below.

The leading tube segment 22 further includes a connection element 34 situated at an end of the leading tube element 28 opposite the leading end 30. The connection element 34 includes a first leg 36 and a second 38 disposed on alternate sides of the leading tube element 28. The first and second legs 36 and 38 are situated on an exterior surface of the leading tube element 28 and can be said to a transverse dimension in a direction extending away from the leading tube element 28 transverse to the longitudinal extent of the leading tube element 28.

The configuration of the connection element 34 of the leading tube segment 22 is the same as other connection elements provided on the middle and trailing tube segments 24 and 26 that will be mentioned below. It is noted, however, that the detail that is presented herein with respect to the connection element 34 of the leading tube segment 22 is equally applicable to the connection elements of the middle and trailing tube segments 24 and 26, and such detail therefore will not be repeated herein for reasons of brevity.

The first leg 36 has a pair of mounting holes 40 formed therein, and the second leg 38 has a pair of connecting elements such as threaded nuts 42 affixed thereto. In FIG. 4A, the nuts 42 are situated on an undersurface of the second leg 38, i.e., an undersurface from the perspective of FIG. 4A. The nuts 42 are cooperable with correspondingly threaded screws 44 (FIG. 7) or other appropriate corresponding fasteners in order to connect together the leading and middle tube segments 22 and 24 and to further connect together the middle and trailing tube segments 24 and 26.

As can further be understood from FIG. 4A, the first leg 36 has a distal edge 46 and a proximal edge 48, both of which are ramped from the perspective of the longitudinal extent of the leading tube element 28. Likewise, the second leg 38 has a distal edge 50 and a proximal edge 52 that are similarly ramped from the perspective of the longitudinal extent of the leading tube element 28. Such ramped edges 46, 48, 50, and 52 facilitate installation and removal of the tube apparatus 12 with respect to the retention apparatus 14 and 114, as will be set forth in greater detail below.

The middle tube segment 24 includes an elongated middle tube element 54 having a first connection element 56 and a second connection element 58 situated at the opposite ends thereof. The first and second connection elements 56 and 58 are similar to the connection element 34.

Figure 7:
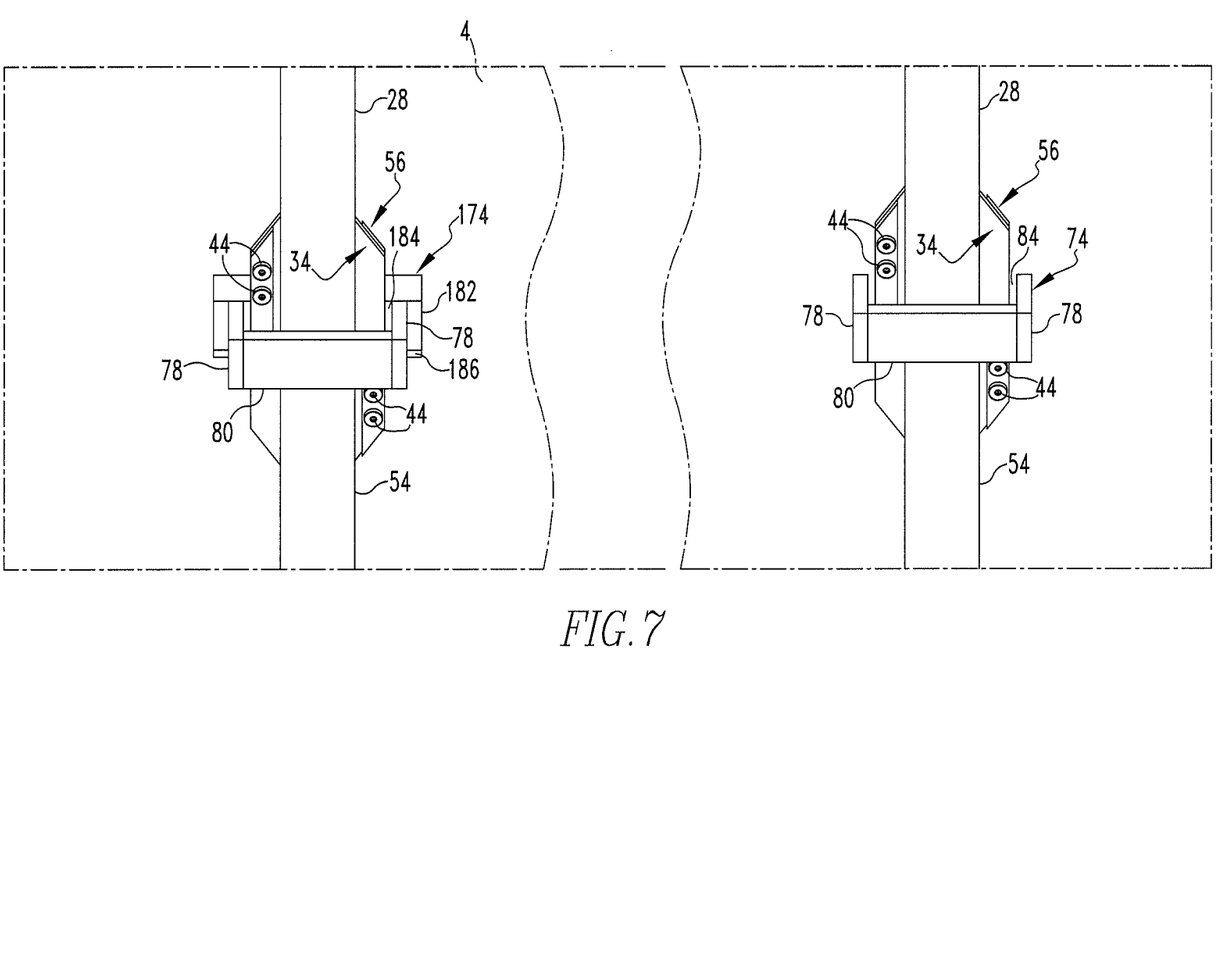
FIG. 7 is an enlarged view of an indicated portion of FIG. 1.

The leading and middle tube segments 22 and 24 are connected together by connecting together the connection element 34 and the first connection element 56. More specifically, the first leg 36 of the first connection element 56 is caused to overlie (from the perspective of FIGS. 4A and 4B) the second leg 38 of the connection element 34 such that the pair of mounting holes 40 are aligned with the corresponding pair of nuts 42. Similarly, the first leg 36 of the connection element 34 is caused to overlie (from the perspective of FIGS. 4A and 4B) the second leg 38 of the first connection element 56 such that the mounting holes 40 are likewise aligned with the corresponding nuts 42. Screws 44, as are indicated generally in FIG. 7, are received in the mounting holes 40 and are threadably engaged with the nuts 42. Other attachment methodologies can be employed depending upon whether fasteners other than threaded screws 44 and nuts 42 are employed, which can be done within the scope of the present invention.

Figure 8:
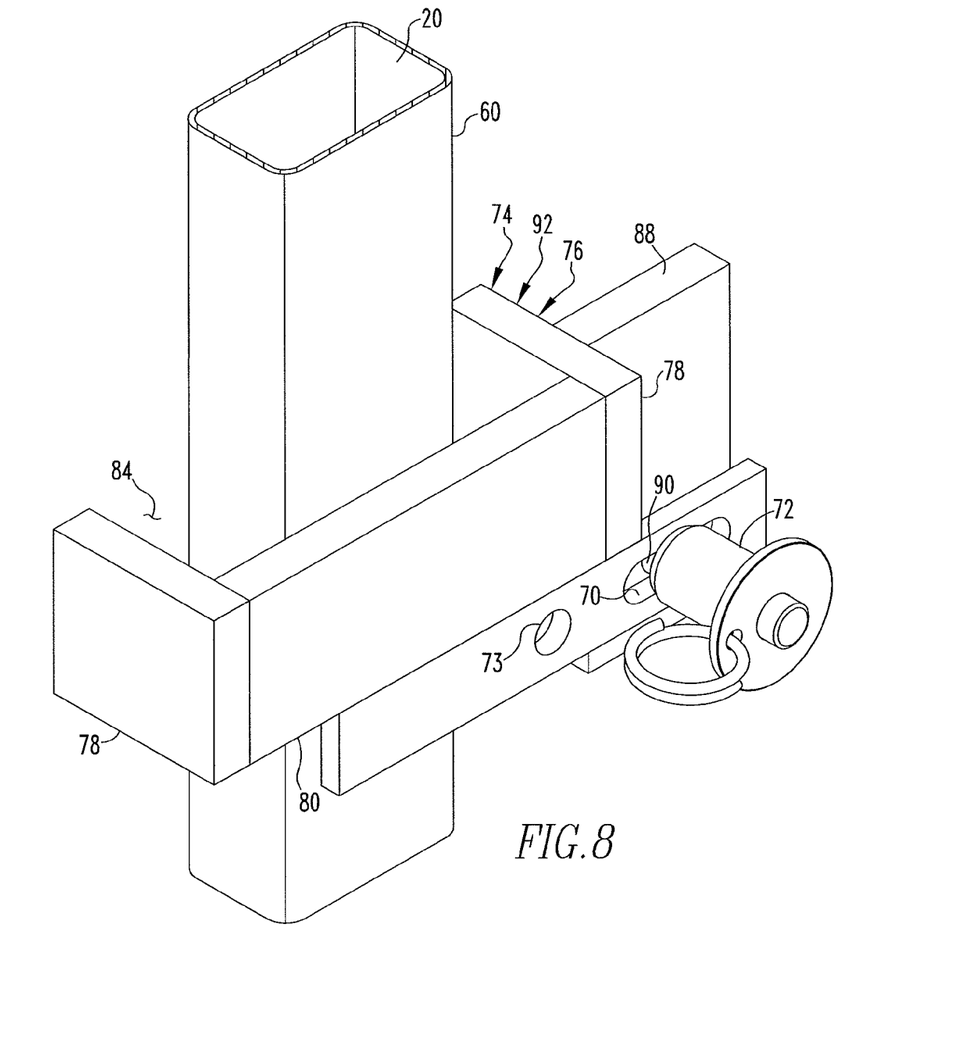
FIG. 8 is an enlarged view of an indicated portion of FIG. 1.

The trailing tube segment 26 includes an elongated trailing tube element 60 having at one end thereof a connection element 62 that is similar to the connection element 34. The trailing tube segment 26 additionally includes a trailing end 64 opposite the connection element 62 and which includes a retention apparatus 66 that is employed to removably affix the tube apparatus 12 and 112 to the retention apparatus 14 and 114. More particularly, the retention apparatus 66 includes an elongated lug 68 that extends from the trailing tube element 60 in a direction generally transverse to the longitudinal extent thereof. The lug 68 has an elongated connection hole 70 formed therein that is configured to receive therein a quick release pin 72, as is depicted generally in FIGS. 3 and 8, in order to connect it with the retention apparatus 14 and 114. The lug 68 also has an opening 73 formed therein to which can be connected a lanyard (not expressly depicted herein) that can be attached to the quick release pin 72 in order to avoid the quick release pin 72 from being lost during installation or removal of the tube apparatus 12 and 112. The middle and trailing tube segments 24 and 26 are connected together by attaching together the second connection element 58 and the connection element 62 in the same fashion as the connection element 34 and the first connection element 56 were connected together.

With reference to FIG. 3, it can be seen that the retention apparatus 14 includes a plurality of brace elements 74, and it can be further seen that the retention apparatus 114 includes a plurality of brace elements 174. The brace elements 74 can be said to include a protruding portion 76 that protrudes away from the interior surface 4 when the brace element 74 is mounted in the interior surface 4. The protruding portion 76 can be said to include a pair of spaced apart lateral braces 78 that are connected with a frontal brace 80 and that together are of a generally U-shaped arrangement having a receptacle 84 situated between the lateral braces and the frontal brace 80. When the brace element 74 is mounted to the interior surface 4 as is depicted generally in FIG. 3, the receptacle 84 is disposed adjacent the interior surface 4.

Brace elements 174 are similar to brace elements 74 in that they include a protruding portion 176 that is the same as the protruding portion 76, but the brace elements 174 additionally each include a base portion in the form of a support plate 182 on which the protruding portion 176 is disposed. The brace elements 174 are mounted to the interior surface 4 by mounting the support plate 182 to the interior surface 4. In such a configuration, the brace elements 174 have a receptacle 184 formed therein that is disposed adjacent the support plate 182 and that is spaced from the interior surface 4.

Figure 5:
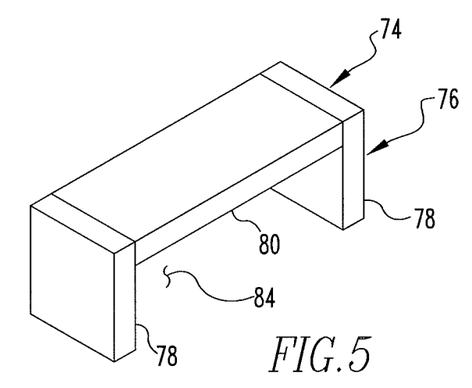
FIG. 5 is a perspective view of a brace element of the first embodiment of the support apparatus.
Figure 6:
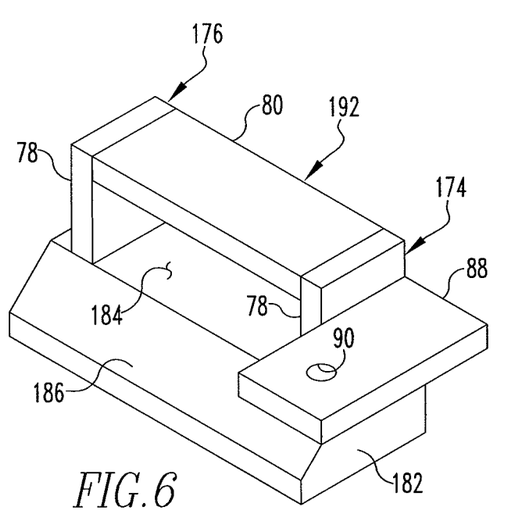
FIG. 6 is a perspective view of a brace element, specifically a retention brace element, of the second embodiment of the support apparatus.

The brace element 174 that is depicted in FIG. 6 is actually further different from the brace element 174 of FIG. 5 since the brace element 174 of FIG. 6 further includes a locking element 88 affixed to the protruding portion 176 and that has a locking hole 90 formed therein. The locking hole 90 is configured to receive therein the quick release pin 72 in order to enable the lug 68 to be affixed to the brace element 174. In this regard, it is noted that the brace element 174 that additionally includes the locking element 88 as is depicted generally in FIG. 6 can be said to be a special type of brace element 174 that is also referred to herein as a retaining brace element 192. That is, the retaining brace elements 192 can be considered to be a subset of the brace elements 174. A locking element 88 can be added to the brace element 74 of FIG. 5 in order to likewise form a retaining brace element 92 as is depicted generally in FIG. 8. The retaining brace elements 92 can likewise be considered to be a subset of the brace elements 74.

It is further noted that the support plate 182 that is depicted on the brace element 174 of FIG. 6 is configured to include a ramped insertion surface 186 that is ramped from the perspective of the longitudinal extent of the tube apparatus 12 and 112. The ramped insertion surface 186 can be employed on the support plate 182 of any of the brace elements 174, as is demonstrated in FIG. 7, and is not limited to use solely on the retaining brace element 192 of FIG. 6.

The retention apparatus 14 and 114 typically will be mounted to the interior surface 4 during initial construction of the containment apparatus 6. During such installation, the brace elements 74 are preferably manipulated sufficiently that the receptacles 84 are aligned with one another. The brace elements 174 are similarly manipulated to cause the receptacles 184 to likewise be aligned with one another. The tube apparatuses 12 and 112 can be installed on the retention apparatuses 14 and 114, respectively, during such initial construction of the containment apparatus 6, although this is not strictly necessary. It is also noted that, depending upon various factors, the retention apparatus 14 and 114 potentially can be installed after construction has been completed on the containment apparatus 6, such as after the containment apparatus 6 and the reactor apparatus 10 have gone through one or more service cycles.

After the reactor apparatus 10 has been installed in the interior region 8, however, the installation and removal of the tube apparatuses 12 and 112 typically will occur from the lower end of the containment apparatus 6, as is indicated by the schematically depicted technician 94 in FIG. 1. Due to the space limitations at such location, the tube apparatus 12 is advantageously provided in three separate segments, i.e., the leading, middle, and trailing tube segment 22, 24, and 26, respectively, which enables segmented installation and removal of the tube apparatus 12 and 112 with respect to the retention apparatus 14 and 114. For example, tube apparatus 12 can be installed on the retention apparatus 14 by successively connecting together and advancing into the retention apparatus 14 the leading, middle, and trailing tube segments 22, 24, and 26.

For instance, the leading tube segment 22 in a condition unconnected with the middle tube segment 24 can be inserted into the retention apparatus 14 by receiving the leading end 30 in the receptacle 84 of the retaining brace element 92 and advancing the leading tube segment 22 through successive receptacles 84 of successively positioned brace elements 74 until the connection element 74 reaches the receptacle 84 of the retaining brace element 92. The middle tube segment 24 can then be connected with the leading tube segment 22 as described above, and the connected-together leading and middle tube segments 22 and 24 can be further advanced into successively positioned receptacles 84 of successively positioned brace elements 74 until the second connection element 58 reaches the receptacle 84 of the retaining brace element 92. The trailing tube segment 26 can then be connected with the middle tube segment 24 as described above. The fully assembled tube apparatus 12 can then be further advanced into successive receptacles 84 until the connection hole 70 of the lug 68 is aligned with the locking hole 90 of the locking element 88. The quick release pin 72 can then be received in the connection hole 70 and the locking hole 90 to affix the tube apparatus 12 to the retention apparatus 14. Disassembly is performed in the reverse fashion.

Depending upon the configuration of the dosimetry system 18, it may be desirable to slide the dosimetry system 18 into the cavity 20 after the tube apparatus 12 has been affixed to the retention apparatus 14 as set forth above, although in other environments it may be desirable to successively install the dosimetry system 18 to the leading, middle, and trailing tube segments 22, 24, and 26 as each is successively installed on the retention apparatus 14. It is also possible that in other environments the tube apparatus 12 may be inserted onto the retention apparatus 14 in a vertically downward direction from the perspective of FIG. 1, i.e., with the technician 94 being situated at the top of the containment apparatus 6. In such an environment, the flexible conduit (mentioned above) that is used between the dosimetry capsules can optionally be replaced with bead chain or another such alternative connection structure.

As can be understood, the ramped proximal and distal edges 48, 50, 52, and 54 facilitate the insertion of the connection elements 34, 56, 58, and 62 in the receptacles 84 and 184 since, by being ramped with respect to the longitudinal extent tube apparatus 12, they cause the tube apparatus 12 to be directed into the central region of the receptacles 84 and 184 whenever any of the ramped edges 48, 50, 52, and 54 engage the brace elements 74 or 174. The ramped insertion surfaces 186 of the support plates 182 provide a similar benefit of directing into the central regions of the receptacle 184 any portions of the tube apparatus 112 that engage the ramped engagement surface 186.

As can be understood from FIG. 7, when the tube apparatus 12 and 112 is installed on the retention apparatus 14 and 114, the first and second legs 36 and 38 are received in the receptacles 84 and 184 whereby the first and second legs 36 and 38 are situated closely adjacent the lateral braces 78. While the receptacles 84 and 184 are spaced to accommodate the leading, middle, and trailing tube elements 28, 54, and 60 with room to spare to facilitate insertion, the connection elements 34, 56, 58, and 62 are configured such that relatively little space is provided between the first and second legs 36 and 38 and the lateral braces 78. This resists azimuthal motion of the tube apparatus 12 and 112, i.e., motion in a circumferential direction, with respect to the retention apparatus 14 and 114, which improves the reliability of the positioning of the dosimetry system 18 with respect to the reactor apparatus 10.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention which is to be given the full breadth of the appended claims and any and all equivalents thereof.

What is claimed is:

1. An apparatus comprising:
    a containment apparatus having an interior region;
    a reactor apparatus, at least a portion of which is situated within the interior region;
    a dosimetry system;
    a support apparatus that is structured to support the dosimetry system within the interior region of the containment apparatus, the containment apparatus having an interior surface adjacent the interior region, at least a portion of the support apparatus being situated between the interior surface and the at least portion of the reactor apparatus that is disposed in the interior region, the support apparatus comprising:
        a retention apparatus comprising a plurality of brace elements that are each mounted to at least one of the containment apparatus and the at least portion of the reactor apparatus, at least some of the brace elements each having a receptacle formed therein; and
        a tube apparatus comprising a plurality of elongated tube segments that are connected together and that together have a longitudinal cavity, at least a portion of the tube apparatus being received in at least some of the receptacles, at least a portion of the dosimetry system being situated in the longitudinal cavity, the tube apparatus being structured to support the dosimetry system.

2. The apparatus of claim 1 wherein the plurality of tube segments comprise a leading tube segment comprising an elongated leading tube element and further comprising a leading end that is shaped to have an outer surface of which at least a portion is oriented at an angle oblique to the longitudinal extent of the tube element, the leading end being receivable through at least some of the receptacles.

3. The apparatus of claim 2 wherein the leading end comprises a number of rod elements connected with the leading tube element and bent to form a rounded structure having the outer surface.

4. The apparatus of claim 2 wherein the plurality of tube segments comprise a trailing tube segment comprising an elongated trailing tube element and further comprising a trailing end that includes another apparatus that is structured to be connected with a retaining brace element of the plurality of brace elements.

5. The apparatus of claim 4 wherein the another apparatus comprises an elongated lug connected with the trailing tube element that is cooperable with a pin that is structured to be engaged with the retaining brace element.

6. The apparatus of claim 5 wherein the lug has a hole formed therein and wherein the retaining brace element has another hole formed therein, the pin being receivable in the hole and the another hole to retain the tube apparatus in the receptacles.

7. The apparatus of claim 1 wherein at least some of the brace elements of the plurality of brace elements each comprise a protruding portion structured to be mounted on the interior surface of the containment apparatus, the receptacle being situated adjacent the protruding portion and being structured to be situated adjacent the interior surface.

8. The apparatus of claim 1 wherein at least some of the brace elements of the plurality of brace elements each comprise a base portion and a protruding portion, the protruding portion being disposed on the base portion, the base portion being structured to be mounted to the interior surface of the containment apparatus, the receptacle being situated adjacent the base portion and being structured to be spaced from the interior surface.

9. The apparatus of claim 8 wherein at least some of the base portions each have a ramped insertion surface that is situated adjacent the receptacle and that is structured to direct the tube apparatus toward the receptacle when the ramped insertion surface and the tube apparatus become engaged with one another.

10. The apparatus of claim 1 wherein at least some of the tube segments of the plurality of tube segments each comprise an elongated tube segment and a connection element, the connection element being situated on an exterior surface of the tube segment and having a transverse dimension in a direction extending away from the tube segment transverse to the longitudinal extent of the tube segment.

11. The apparatus of claim 10 wherein at least some of the connection elements each comprise an inclined first edge oriented oblique to the longitudinal extent of the tube segment, the inclined first edge being structured to direct the connection element toward the receptacle when the inclined first edge and a brace element of the plurality of brace elements become engaged with one another.

12. The apparatus of claim 11 wherein the tube apparatus further comprises another apparatus that is structured to be connected with a retaining brace element of the plurality of brace elements, and wherein at least one connection element is structured to be situated in one of the receptacles when the another apparatus and the retaining brace element are connected.

13. The apparatus of claim 11 wherein the at least some of the connection elements each further comprise an inclined second edge opposite the inclined first edge and oriented oblique to the longitudinal extent of the tube segment, the inclined second edge being structured to direct the connection element toward the receptacle when the inclined second edge and a brace element of the plurality of brace elements become engaged with one another.

14. The apparatus of claim 1 wherein the receptacles are aligned with one another.

15. The apparatus of claim 1 wherein the tube segments are detachably connected together, and wherein the at least portion of the tube apparatus is removably received in the at least some of the receptacles.

* * * * *